United States Patent [19]

Meuschke et al.

[11] 4,086,132
[45] Apr. 25, 1978

[54] COMBINED FUEL ASSEMBLY AND THIMBLE PLUG GRIPPER FOR A NUCLEAR REACTOR

[75] Inventors: Robert E. Meuschke, Penn Hills Township, Alleghany County; Adelbert E. Satterlee, Plum Borough, both of Pa.

[73] Assignee: Westinghouse Electric Corporation, Pittsburgh, Pa.

[21] Appl. No.: 685,827

[22] Filed: May 13, 1976

[51] Int. Cl.² ............................ G21C 19/20; G21C 7/08
[52] U.S. Cl. .......................................... 176/30; 176/33
[58] Field of Search ............................ 176/30, 31, 32, 33, 176/35

[56] References Cited

U.S. PATENT DOCUMENTS

| | | | |
|---|---|---|---|
| 3,691,011 | 9/1972 | Krüger | 176/30 |
| 3,937,513 | 2/1976 | Hoffmeister | 176/30 |
| 3,948,723 | 4/1976 | Andrea | 176/30 |

*Primary Examiner*—Stephen C. Bentley
*Assistant Examiner*—Donald P. Walsh
*Attorney, Agent, or Firm*—J. R. Campbell; Z. L. Dermer

[57] ABSTRACT

A combined fuel assembly and thimble plug gripper for raising and lowering a fuel assembly into a nuclear reactor core, and for lifting and lowering a thimble plug assembly into the fuel assembly, including a vertically movable mast housing a mechanism which causes pivotally mounted fingers on the bottom of the mast to be moved into and out of latching engagement with the nozzle of a fuel assembly when the mast is resting on said assembly. The mast includes a second mechanism which supports second fingers pivotally mounted thereon and actuable by a third mechanism into and out of engagement with a thimble plug assembly supporting plugs adapted to be inserted in control rod guide thimbles in the fuel assembly. The second mechanism further includes an arrangement for lowering or raising the plug assembly respectively into or out of the guide thimbles in the fuel assembly. The apparatus includes control and interlock systems which preclude operation of the mechanisms under certain prescribed conditions.

18 Claims, 15 Drawing Figures

COMBINED FUEL ASSEMBLY AND THIMBLE PLUG GRIPPER FOR A NUCLEAR REACTOR

BACKGROUND OF THE INVENTION

The reactor core for commercial nuclear reactors of the type used for generating electric power, contain about 200 fuel assemblies disposed in a predetermined pattern in the reactor core. Each fuel assembly comprises a multiplicity of fuel rods interspersed with a small number of control rods guide thimbles which are hollow tubes designed to receive control rods adjustably positioned therein to vary the reactor core heat energy output during reactor operations. Although all assemblies do not need control rods, each assembly nevertheless is equipped with control rod guide thimbles to accommodate control rods in the event the assembly later is placed in a control position in the reactor core. Since reactor coolant can flow upwardly through the hollow control rod guide thimbles in fuel assemblies which do not contain control rods, a plug conventionally is positioned in the top of each unused guide thimble. These plugs are connected to a common plate removably positioned on the top of each assembly thus permitting removal of all plugs from one fuel assembly in one operation. In carrying out their function precluding passage of coolant through the unused guide thimbles, the plugs are forcefully held in a static position and accordingly cause the coolant to flow into contact with the heat generating fuel rods.

After a predetermined period of reactor operation, the fuel assemblies are rearranged in the reactor core. Spent fuel assemblies are removed and replaced by new assemblies, and partially spent fuel assemblies are moved to different positions in the core. During the course of carrying out this refueling operation, plugs in the guide tubes must be removed and reinserted in different assemblies. According to one prevailing practice, the plugs are removed as a unit from each assembly after its removal from the reactor and during the time it is in the assembly transfer system, or in a change fixture. In either event, a long handled tool especially designed for plug removal purposes is utilized to effect plug removal from a particular assembly. This operation is exceedingly time consuming because the assembly must remain submerged in a neutron absorbing liquid or coolant during the refueling operation and the operators must therefore work under poor visibility conditions. Since the tool is approximately 30 feet long, its unwieldiness causes tool-thimble plug alignment problems, during the time of plug removal and insertion. Further, the plug removal hoist mechanism must frequently move between the reactor and fuel assembly transfer area as plugs are removed from some assemblies and replaced in other assemblies located in the reactor.

The total time applied to plug removal and replacement in control rod guide thimbles accounts for an important part of the complete refueling operation. Since an electric power generating utility cannot generate and sell electric power during reactor down time for refueling, it is apparent the need exist for improved apparatus for removing and replacing guide thimble plugs in substantially less time than that presently required and in a more reliable, safe and efficient manner.

SUMMARY OF THE INVENTION

In accordance with this invention, the above disadvantages of the prior art are overcome by providing a combined fuel assembly and guide thimble plug gripper which acts to lift an assembly from a reactor core and remove or replace the guide thimble plugs therein in a single operation. The gripper apparatus includes a housing enclosing vertically movable mechanisms and finger actuating devices therein which separately grasp the fuel assembly and the guide thimble plugs to effect their insertion or removal from the reactor core. The apparatus is designed to permit plug removal from the assembly during the time the assembly is still in the reactor, during transit to a fuel transfer area or while in a stationary position after removal from the reactor core. An appropriately designed control and interlock system is provided to assure safe and reliable, removal, lifting, transfer and insertion of both fuel assembly and thimble plugs during a reactor refueling operation.

An object of the invention therefore is to provide a combined fuel assembly and control rod guide thimble plug gripper capable of changing a fuel assembly in a reactor core and thimble plugs in control rod guide thimbles in the assembly.

Another object of the invention is to provide a combined fuel assembly and control rod guide thimble plug gripper housed in a common enclosure and which are independently operable to either change a fuel assembly in a reactor core or to remove and insert guide thimble plugs in a fuel assembly regardless of its location.

Another object of the invention is to provide a control and interlock system for a combined fuel assembly and control rod guide thimble plug gripper which precludes operation of either fuel assembly and plug gripper latching mechanisms after a fuel assembly or thimble plug is latched into a lifting position.

Still another object of the invention is the provision of a combined fuel assembly and control rod guide thimble plug gripper which is of greater design simplicity, economical to construct and more efficient in operation than prior art fuel assembly and thimble plug lifting mechanisms.

BRIEF DESCRIPTION OF THE DRAWINGS

While the specification concludes with claims particularly pointing out and distinctly claiming the subject of the invention, it is believed the invention will be better understood from the following description taken in connection with the accompanying drawings wherein:

DESCRIPTION OF THE PREFERRED EMBODIMENT

Figure 1:
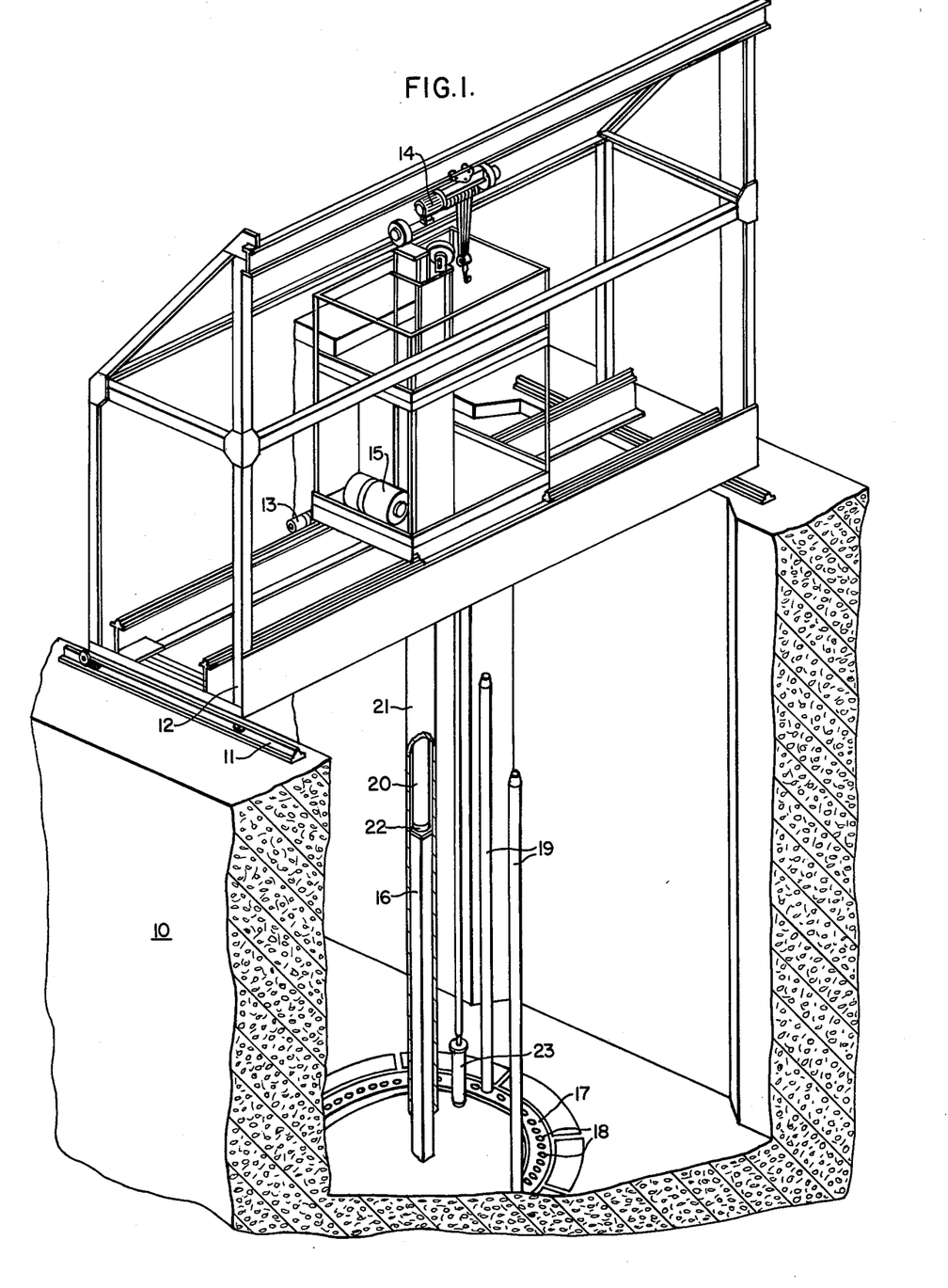
FIG. 1 orients the invention in a reactor refueling system and illustrates the relationship between the combined fuel assembly and guide thimble plug gripper and a fuel assembly as the fuel assembly is being lifted from the core of a nuclear reactor.

Referring now to the drawings, there is shown in FIG. 1 an arrangement used for withdrawing a fuel assembly from the core of a nuclear reactor. The massive concrete structure 10 shown comprises the containment for a nuclear reactor having rails 11 mounted on its upper surface on which crane 12 is mounted for movement. The crane includes a structural arrangement for supporting drive motors such as 13 to facilitate crane movement and motors 14 and 15 which operate hoists used during the reactor refueling operations. The reactor core includes a multiplicity of fuel assemblies, such as the fuel assembly 16, are positioned in a predetermined pattern in the reactor pressure vessel 17. It will be understood that during the time of operation of the reactor, a closure head, not shown, is mounted on the pressure vessel and is secured thereto by bolts which extend through the closure head and into openings 18 formed in the upper part of the pressure vessel. Guide studs 19 orient the closure head to a precise position as it is lowered onto the pressure vessel.

During the reactor refueling operation, the closure head is removed and a stationary housing 21 permanently and immovably attached to the underside of the crane structure 12, is moved by the crane into a position over the open reactor vessel and above a fuel assembly to be removed. The combined fuel assembly and thimble plug gripper mast 20 which encloses the invention described herein, is lowered by hoist motor 15 through the stationary housing 21 and onto the top of a fuel assembly to be removed from the reactor vessel. As more fully described hereafter, latching fingers grasp the fuel assembly nozzle 22 which is permanently attached to the uppermost portion of the fuel assembly, and upon operation of the hoist motor 15, the gripper and its attached fuel assembly are then raised upwardly out of the reactor core and into a position to be transferred through the containment to a fuel transfer system. Since the control rods are withdrawn from the fuel assemblies during a reactor refueling operation, the fuel assemblies being transferred must remain submerged in a neutron absorber coolant, such as water having a high concentration of boron. The containment area therefore is filled with such coolant up to a level about one foot below the top wall of the containment. Although the invention described herein is disclosed in relation to a pressurized water reactor, it will be apparent that the invention structure and concepts are equally applicable to other types of reactors, such as sodium cooled reactors which also require that the fuel assemblies be transferred submerged in an appropriate coolant. A television camera 23 mounted on the end of a vertically adjustable tube is lowered into the reactor to facilitate the fuel assembly loading and unloading operation.

Figure 2:
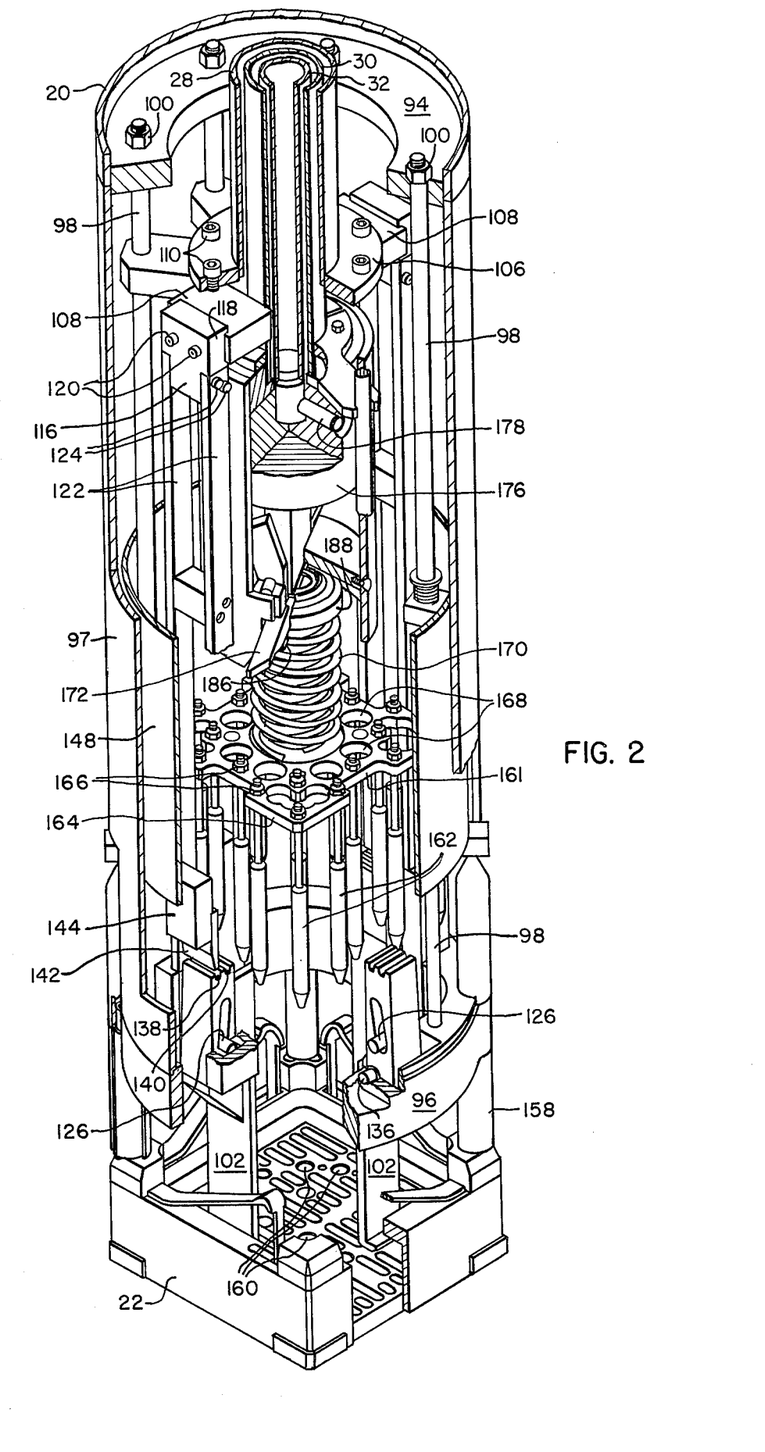
FIG. 2 is an isometric view of the invention with parts broken away to show the disposition of components after a guide thimble plug has been removed from the top of a fuel assembly.

FIGS. 2 through 11 illustrate design details of the fuel assembly and thimble plug gripper. Separate latching fingers used for raising a fuel assembly, and for lifting guide thimble plugs from the top of the fuel assembly, are shown in a latched position. The parts assume this position after the gripper mast 20 is lowered through the stationary housing 21 and onto the top of the fuel assembly, followed by operation of gripper mast components which move the latching fingers into a latching position. FIG. 2 on the other hand illustrates the position of parts after the gripper mast has been lowered to the top of a fuel assembly as in FIG. 3, and in both FIGS. 1 and 2 the guide thimble plugs have already been withdrawn from the top of the fuel assembly and are shown in a suspended condition. Since the detailed design is illustrated in FIGS. 3 through 11 and because it is not possible to show all of such detailed parts in the isometric view of FIG. 2, the latter view is being used to provide perspective on the complete design of the invention.

As previously stated, the combined fuel assembly and guide thimble plug gripper is designed to perform two functions, namely, to lift a fuel assembly from the core of a nuclear reactor during the time of a refueling operation, and secondly, to remove plugs from a fuel assembly which conventionally are used to close the openings in unused control rod guide tubes or thimbles through which coolant would otherwise flow during the time of reactor operation. The design is chosen such that the guide thimble plugs may be removed from the fuel assembly either during the time the fuel assembly is in the reactor core, during its transit from the reactor core to a fuel transfer area, or during the time the fuel assembly is located in the fuel transfer area.

These functions are carried out by enclosing all of the operating components in the gripper mast 20 which preferably is of cylindrical configuration and about 21 feet in length, and designed to be supported from its upper end by the crane illustrated in FIG. 1. The mast is closed at its upper end by a plate 22 secured to a ring 25 welded to the upper section of the mast and held in place by bolts 26. Three concentrically mounted tubes comprising a fuel assembly finger actuator tube 28, guide thimble plug actuator tube 30 and guide thimble plug raise-lower tube 32 are centrally disposed within the mast 20. Each of these tubes are arranged to be separately moved vertically and for a purpose more fully described hereafter. The tubes are raised and lowered by pneumatic actuators located inside the gripper mast 20 and secured to plate 22. As is more clearly shown in FIGS. 3 and 4, a pair of oppositely disposed pneumatic actuators or air motors 46 attached to the upper plate by nuts 48 respectively actuate the fuel assembly finger actuator tube 28 while air motors 50 likewise secured to plate 22 by nuts 52, causes reciprocation of guide thimble plug actuator tube 30. The single pneumatic actuator 54 used for actuating the thimble plug raise and lower mechanism also is attached to plate 22 by nut 56. The piston in each of the air cylinders is of a double acting type with shafts connected to the opposite ends thereof. Shafts which extend from the pistons upwardly through plate 22 are designed to actuate limit switches in a manner more fully described hereafter. The shafts 58 and 60 respectively extending downwardly from fuel assembly gripper pneumatic actuator 46 and the thimble guide gripper pneumatic actuator 50 are each externally threaded to permit vertical adjustment in connecting rods 62 and 64. Connecting rods 62 are connected to and actuate fuel assembly finger actuator tube 28 while connecting rods 64 are connected to and actuate guide thimble plug finger actuator tube 30. Shaft 66 extending downwardly from the thimble raise-lower actuator likewise is externally threaded and is adjustably mounted in a plate 68 welded or otherwise affixed to thimble plug raise-lower tube 32 so as to permit vertical adjustment between the connecting members.

Figure 3A:
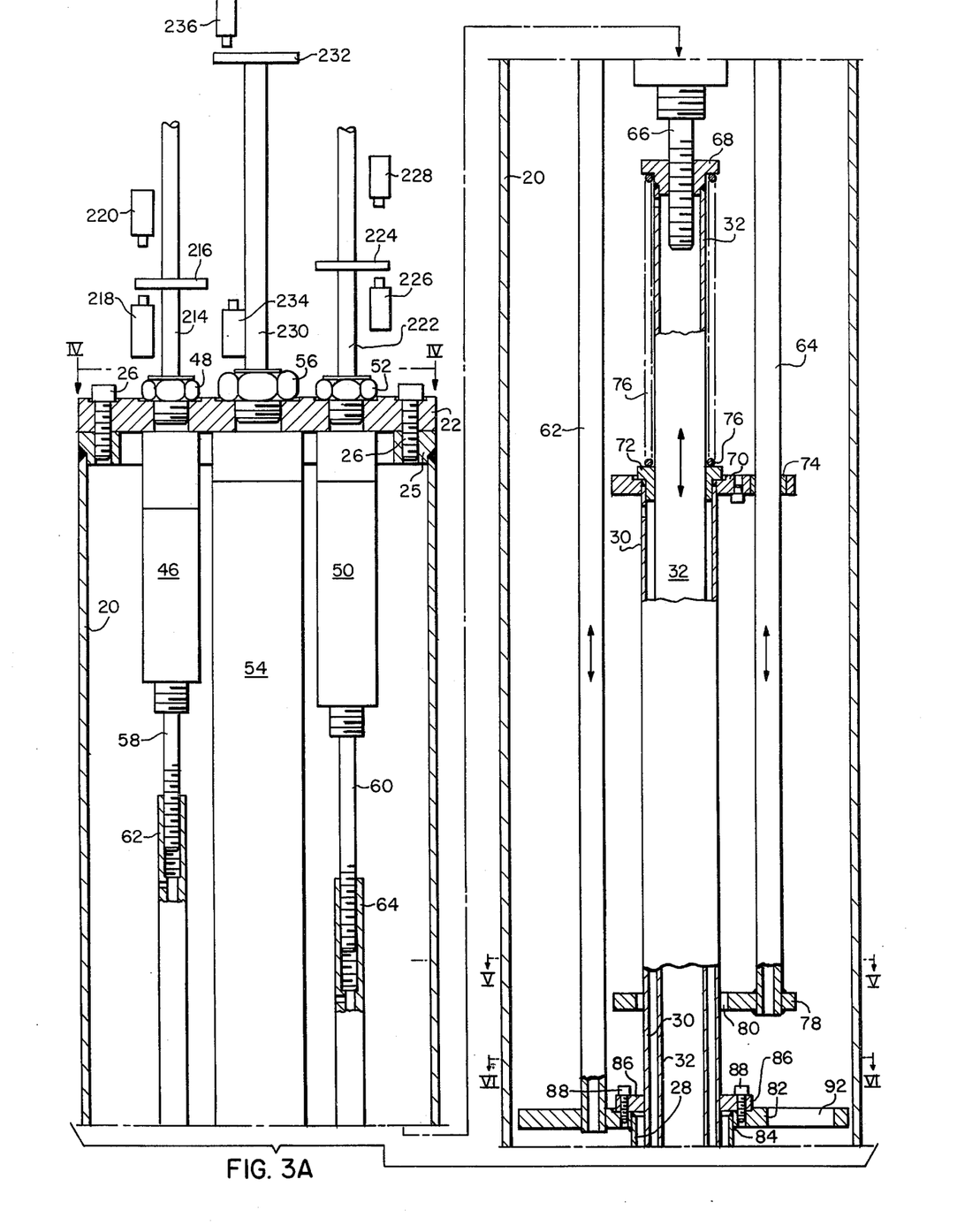
FIGS. 3A and 3B represent a single view in elevation partly in section showing the relationship of parts in a latched position wherein fuel assembly latching fingers are in position to lift a fuel assembly and the guide thimble plug gripper is in a latched position with the plug already raised from the fuel assembly.
Figure 3B:
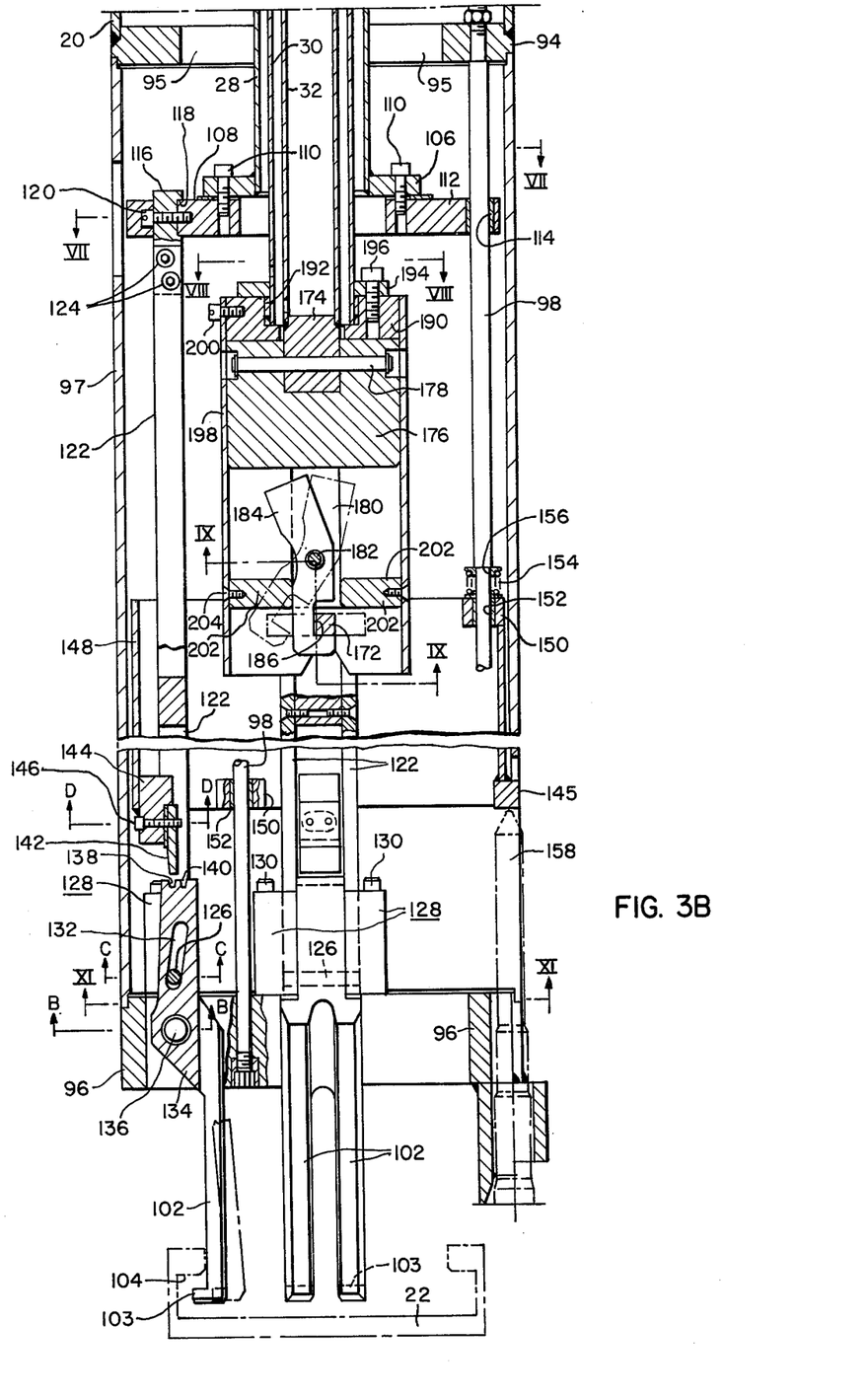
Figure 4:
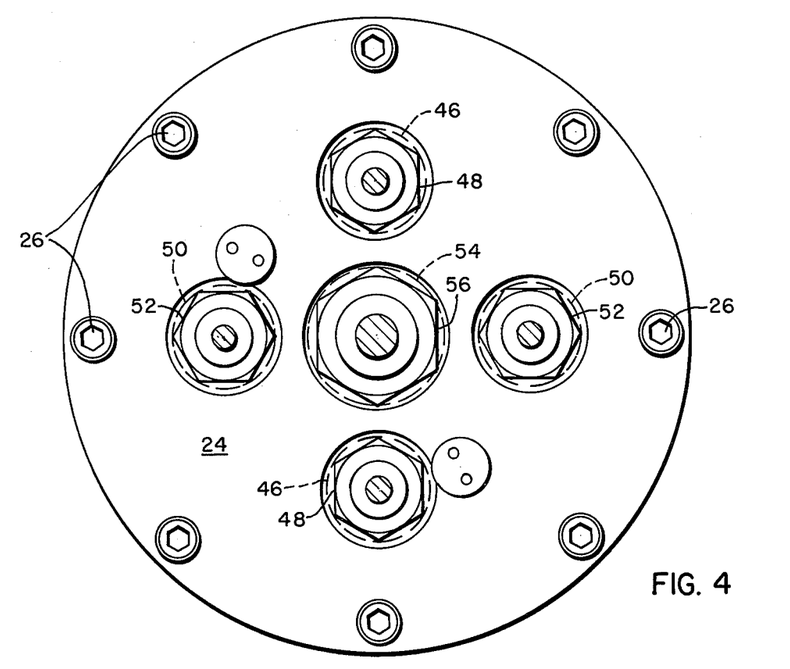
FIG. 4 is a plan view taken essentially on the lines IV—IV of FIG. 3.
Figure 5:
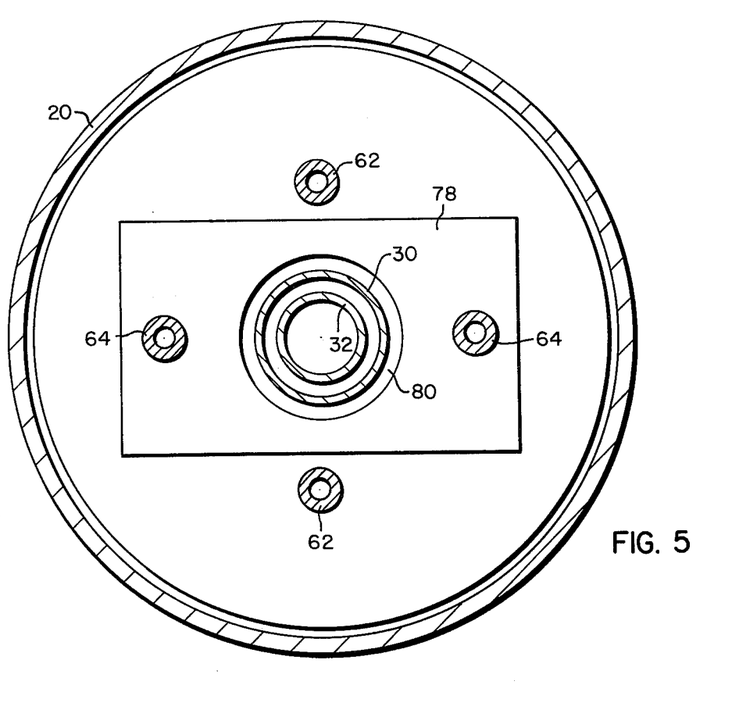
FIG. 5 is a view taken on lines V—V of FIG. 3 which illustrates the arrangement of concentric tubes used for actuating the thimble plug latching fingers between latched and unlatched positions and raising and lowering the thimble plug gripper.
Figure 6:
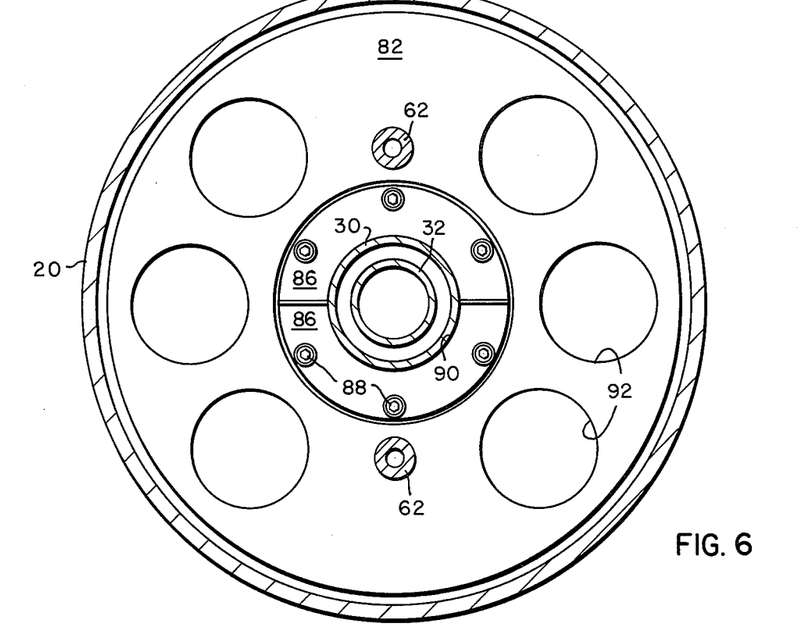
FIG. 6 is a view taken on lines VI—VI of FIG. 3 showing the arrangement used for holding the fuel assembly gripper finger actuator tube.

To provide for reasonable alignment between the operating parts, plate 70 welded to the upper end of thimble plug actuator 30 contains a bushing 72 which serves as a guide bearing for tube 32 and as a spacer to maintain tubes 30 and 32 in spaced relationship with each other. Guide bearings 74 are also provided for the thimble plug gripper shaft 64. Spring 76 concentrically disposed around tube 32 acts to impose a load on the thimble plug gripper as more fully described hereafter. As shown in FIGS. 3 and 5, rod 64 is welded at its lower end to plate 78 having an opening 80 which permits unimpeded movement of tubes 30 and 32 therein. Shaft 64 is actuated by pneumatic actuator 50, the position shown in FIG. 3 illustrating the lowermost position of tube 64 and its attached plate 78.

The connecting rods 62 extending downwardly from actuator 46 moves the fuel assembly finger actuator tube 28 vertically. The structure employed for accomplishing this action includes a plate 82 welded to the lower ends of the oppositely disposed connecting rods 62. Plate 82 also is welded to the upper end of the fuel assembly finger actuator tube 28 thereby providing a direct mechanical connection between the pneumatic actuator piston and reciprocal tube 28. A guide bearing 86 attached to plate 82 by bolts 88 permits relative sliding movement between tubes 28 and 30. It will be noted that the periphery of plate 82 is spaced from the inner surface of gripper mast 20 and the plate is provided with a number of openings 92 through which coolant inside the mast flows as the plate 82 is moved vertically during operation.

Figure 7:
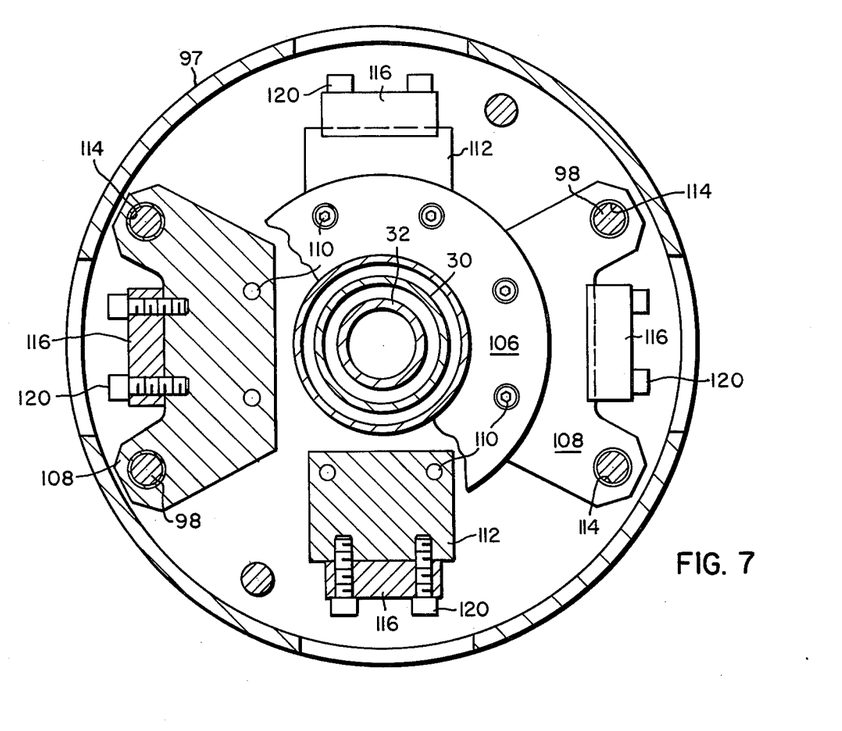
FIG. 7 is a view taken on lines VII—VII of FIG. 3 showing the arrangement of mounting blocks and guides for guiding connector bars associated with the fuel assembly gripper finger actuator.
Figure 8:
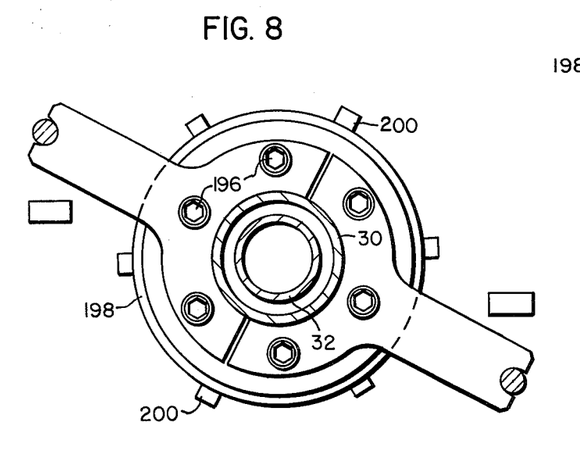
FIG. 8 is a view taken on lines VIII—VIII of FIG. 3 showing the arrangement used for horizontal and rotational guidance of the thimble guide plug gripper.
Figure 9:
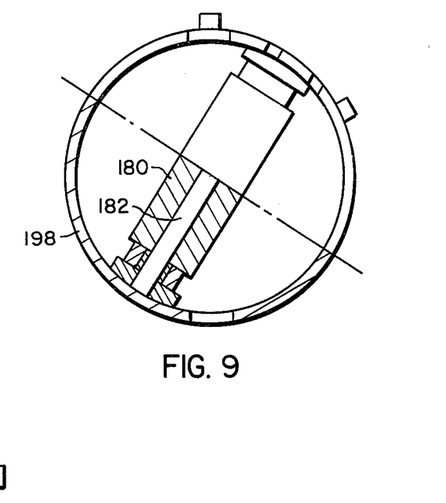
FIG. 9 is a view taken on lines IX—IX of FIG. 3 showing the mounting arrangement for the thimble guide plug gripper.
Figure 10:
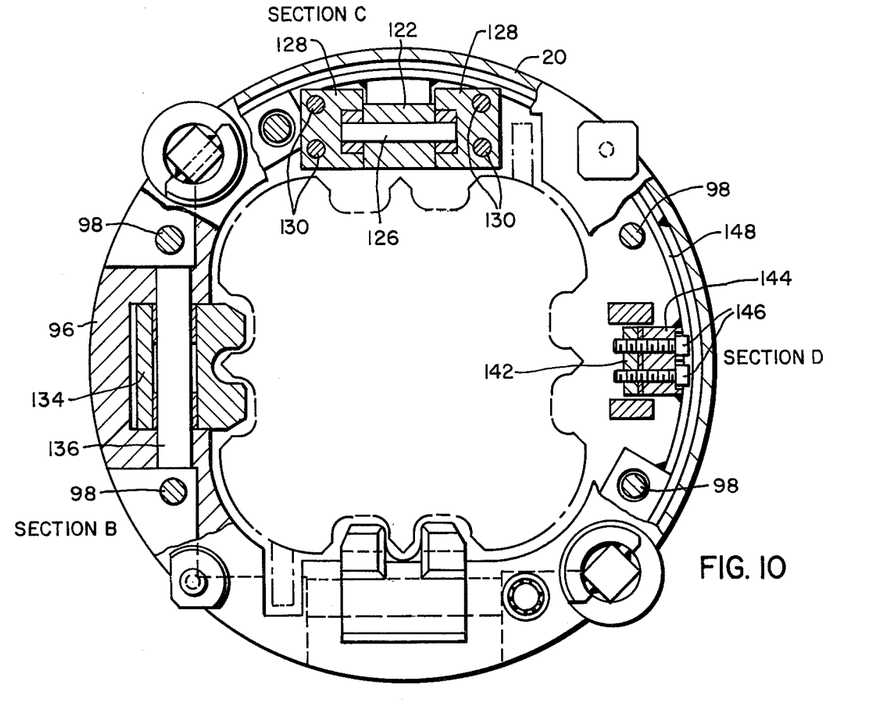
FIG. 10 is a composite sectional view which shows details of construction taken on the section lines B—B, C—C and D—D of FIG. 3.
Figure 11:
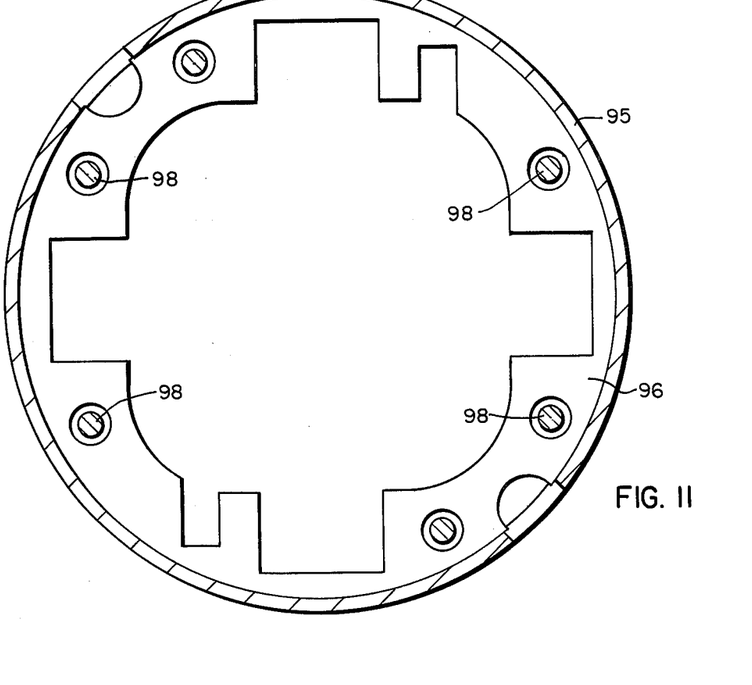
FIG. 11 is a view taken on lines XI—XI of FIG. 3.

FIGS. 2, 3 and 7 illustrate a plate and tie rod arrangement for providing rigidity to the structure and for maintaining alignment between the parts. A permanently fixed plate 94 having coolant openings 95 therein is welded to the gripper mast 20. A lower plate 96 is attached to the lower end of gripper mast 20 by the tie rods 98 which extend through openings in plates 94 and 96 and are secured by nuts 100 firmly clamping sleeve 97 between the plates 94 and 96. This arrangement imparts stability to the structure in the area needed thus permitting cylindrical sleeves, arms and latches to freely move without binding or distorting which otherwise might result from misalignment of the parts.

It will be understood that the fuel assembly gripper actuators 46, connecting rods 62 and the fuel assembly finger actuator tube 28 act through a mechanism to cause gripper fingers 102 to engage a flange 104 formed on the top of the fuel assembly nozzle 22 and thus provide the locking arrangement necessary for lifting a fuel assembly from the reactor core. The mechanism used for effecting actuation of the assembly gripper fingers and for mechanically locking the gripper mast to a fuel assembly includes a number of parts movable relative to one another as shown in the lower sections of FIG. 3. A circular plate 106 welded to the bottom of the assembly finger actuator tube 28 supports a pair of oppositely disposed mounting blocks 108, FIGS. 3 and 7, by means of bolts 110. In addition to the plates 108, a pair of oppositely disposed support blocks 112 are likewise secured to the plate 106 by bolts 110. The mounting blocks 108 carry guide bearings 114 through which tie rods 98 extend to help maintain the parts in alignment as they reciprocate vertically in the gripper mast.

The mechanism further includes clamps 116, each having a groove 118 complementary to the end surface of blocks 108 and 112, such clamps being held to the blocks by bolts 120. As more particularly shown in FIG. 7, four such clamps 116 are equally spaced around the assembly finger actuator tube 28. A pair of downwardly extending connector bars 122 are attached to each of the four U-shaped clamps 116 by bolts 124. These four pairs of spaced bars extend downwardly and terminate in an actuator cam 126 which bridges or extends between each pair of connector bars 122. The lower end of the connector bars are arranged for slidable movement in grooves formed in guide blocks 128 attached to the base plate by bolts 130. As shown in FIGS. 2 and 3 and section C of FIG. 10, the cam 126 in each of the four connector bars 122, will move vertically as the connector bars 122 and the attached fuel assembly finger actuator tube 28 is moved vertically. The central part of the cam 126 extends through a slot 132 formed in the fuel assembly gripper fingers 102. These gripper fingers 102 are spaced at 90° intervals around the bottom of gripper mast 20 and each finger 102 includes a lip 103 designed to engage the underside of flange 104 on fuel assembly nozzle 22. This structure serves to lift a fuel assembly from the reactor core during a reactor refueling operation. The bottom section of each gripper finger merges into a solid casting 134 having a central opening therein for receiving pivot pin 136. As shown in the perspective view of FIG. 2, the pivot pin 136 is mounted in the base plate 96 and allows gripper fingers 102 to move between latched and unlatched positions. It will be apparent that as the actuator tube 28 and the attached connector bars 122 are moved vertically upwardly, the actuator cam 126 will accordingly move on the same longitudinal line and ride up the slot 132 formed in the casting 134 of the gripper fingers. In so doing, the gripper fingers will pivot about pivot pin 136, and as shown in FIG. 3, move in a direction to the right as shown by the dotted lines and toward an unlatched position. Conversely, as the actuator tube 28 and connector bars 122 move downwardly, the pivot pin 126 will ride downwardly in the slot 132 thus causing the gripper fingers 102 to pivot about pivot pin 136 and toward a latched position as shown by the solid lines in FIG. 3.

In order to lock the gripper fingers 102 in a latched or unlatched position, the upper part of each gripper finger casting 134 is equipped with a pair of serrations or slots 138 and 140. These slots are arranged to be engaged by a locking key 142 attached to a mounting block 144 by bolts 146, the mounting block being welded or otherwise affixed to the bottom end of a guidance tube 148. When finger locking keys 142 engage their respective slots 138, gripper fingers 102 will always be locked in a latched position, and when keys 142 engage slots 140, the gripper fingers will always be locked in an unlatched position.

A number of guide blocks 150, one for each of four tie rods 98 which extend between the upper and base plates 94, 96, are welded or otherwise affixed to both the upper and lower end of the guidance tube 148. Each block contains a guide bearing 152 which facilitates movement of the guidance tube on the tie rods as it is moved upwardly and downwardly on the tie rods. A spring 154 mounted on each tie rod is held in place by a retainer which bears against a tie rod flange 156 on one end and against the guide block 150 at its other end. Since the parts are designed in a manner such that each lock key 142 will always be in a latched slot 138 or unlatched slot 140, except when the gripper mast is initially placed on the top of a fuel assembly 22, springs 154 are used to impart a force downwardly, in addition to the weight of the parts, to assure keeping each lock key 142 in slots 138 or 140.

It will be noted that the only time the lock key is not in either of the slots is when the gripper mast is actually resting on the nozzle of a fuel assembly. It is raised out of a slot to the unlocked position shown in FIG. 3, when the guide pins 158 mounted on top of each fuel assembly moves into openings provided in the bottom of the gripper mast as the mast is lowered onto the fuel assembly nozzle. Immediately before the gripper mast bottoms out on the fuel assembly nozzle, the guide pins projecting upwardly from the fuel assembly contact blocks 145 and accordingly move the guidance tube 148 and its attached lock keys 142 upwardly against the action of springs 154 and into the unlocked position shown in the full lines of FIG. 3. As the pneumatic actuators are then actuated and rotate gripping fingers 102 into a latched position, slot 138 is moved into alignment with lock key 142. When the hoist motors raise the gripper mast off the fuel assembly nozzle, guide pins 158 move out of contact with the blocks 145, and the weight of guidance tube 148 and the force imparted downwardly by springs 154 then cause the lock key 142 to engage slot 138 and stay in that position until the gripper mast is once again placed on top of and bottoms out on a fuel assembly nozzle.

Some fuel assemblies in the core of a nuclear reactor are not positioned in a location to receive control rods movable in control rod guide thimbles 160. Provision therefore is made to block the guide thimble openings with plugs 162 shown raised in FIG. 2 and out of their normal nested position in the fuel assembly. These plugs, one for each guide thimble, are attached to a common header plate 164 by nuts 166 and thus comprises a thimble plug assembly. Since coolant flows upwardly through the fuel assembly during reactor operation, coolant flow openings 168 are provided in plate 164 to permit unimpeded flow therethrough. A spring 170 mounted between the plug plate 164 and holddown bar 172 is positioned and arranged to be compressed by the reactor upper core plate, not shown, during installation and maintains it in a compressed condition during reactor operation, the purpose being to assure the retention of plugs 162 in their corresponding guide thimbles 160 and thus preclude coolant flow therethrough during reactor operation. To help provide perspective on the invention, the thimble plug assembly 161 is shown in FIG. 2 as being removed from the fuel assembly but the gripper mast is still positioned on the fuel assembly nozzle and the fingers 102 are illustrated as being in a latched position.

The construction used for removing and inserting thimble plugs in a fuel assembly is illustrated in FIGS. 2, 3, 8 and 9. The thimble plug actuator tube 30 is used to cause gripper fingers 184 to unlatch and latch on to the gripper plug assembly holddown bar 172. Thimble plug raise-lower tube 32 positioned inside tube 30, is used for lifting the thimble plug assembly from the fuel assembly after gripper fingers 184 are latched in position, and for lowering the thimble plug assembly into a plug nesting position in guide thimbles 160. The thimble plug raise-lower tube 32 is welded at its lower end to a boss 174 centrally disposed in the gripper mast. Boss 174 is coupled to a gripper body 176 by pin 178. A subtending member 180 integrally formed with the gripper body carries a pivot pin 182 on which the plug gripper fingers 184 are pivoted. The lower end of the gripper fingers includes a U-shaped opening 186 which is designed to move into a latched position beneath the laterally extending holddown bar 172 attached to spring guide 188, FIG. 2. As illustrated in FIG. 3, the gripper fingers may move between a latched position indicated by the solid lines in FIG. 3 and an unlatched position shown by the dotted lines in FIG. 3.

The mechanism for moving the gripper fingers between latched and unlatched positions includes a flange 190 having a central opening which surrounds spacer 192 welded to the lowermost end of tube 30. The flange 190 is supported from a plate 194 by bolts 196. A sleeve 198 is attached to the flange 190 by bolts 200 and as shown in FIG. 3, the sleeve extends downwardly to encompass the gripper body 176 and the gripper fingers 184. The sleeve further includes plates 202 held to the sleeve by bolts 204, the plates being arranged to provide a central opening slightly larger than the gripper finger body which is located therein.

After the gripper mast is lowered onto a fuel assembly nozzle, the thimble plug raise-lower tube 32 is moved downwardly by pneumatic actuator 54 to a position where the gripper fingers 184 may be moved from the unlatched to the latched position. It will be understood that when the gripper fingers are in the above-described position, plates 202, which function as a cam, will be located immediately thereabove. To move the gripper finger to the latched position, the actuator tube is moved downwardly and the sleeve 198 therefore moves relative to the stationary gripper body 176. During its course of movement downwardly, the plate cam 202 engages a side of the gripper finger and moves the finger about pivot 182 to a position under bar 172 on the thimble plug assembly. Thereafter, the thimble plug raise-lower tube 32 is moved upwardly to the solid line position shown in FIG. 3, thus pulling the thimble plug assembly and the plugs attached thereto from the control rod guide thimbles located in the fuel assembly. FIG. 2 illustrates the position of the plug assembly after it has been withdrawn from the fuel assembly nozzle.

Figure 12:
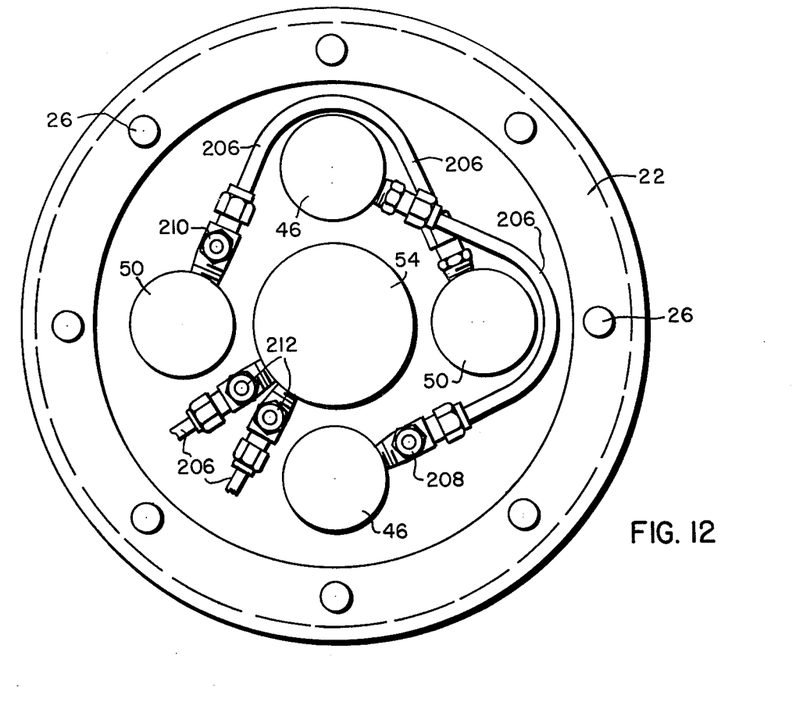
FIG. 12 shows the air supply system for the mast.

Since the gripper mast is designed to raise and lower a fuel assembly and a thimble plug assembly therein, a number of operating elements located on top the gripper mast contribute importantly to operation of the complete system. The air lines leading to and from the fuel assembly gripper pneumatic actuator 46, thimble plug gripper pneumatic actuator 50 and thimble plug raise-lower actuator 54 are arranged to be mounted on plate 24 located on the upper part of the mast. These components are of conventional design and since each pneumatic actuator or air motor contains a piston designed for double acting operation, air is alternately supplied to opposite sides of the piston to achieve appropriate connecting rod movement in the manner described above. In order for the air actuators to operate properly, as air is supplied to one side of the piston to cause vertical movement, air on the other side must be vented through lines which discharge directly into a tank or the atmosphere. Since these details of design are well known in the art, the corresponding structure is not being illustrated in these drawings. However, it is important to note that each of the air supply lines leading to each of the cylinders, is equipped with a solenoid operated valve which is actuated to secure actuator operation in a manner more fully disclosed hereafter. Referring to FIGS. 2, 3 and 12, it will be seen that each pneumatic actuator 46, 50 and 54 have air lines 206 connected at one end thereto and adapted for connection at their other ends to a source of air supply. To minimize the number of air lines needed, the fuel assembly gripper pneumatic actuators 46 are connected in parallel as are the thimble plug gripper actuators 50. The actuator 46 is equipped with a double solenoid operated valve 208 in the air lines leading thereto while actuator 50 likewise is equipped with a double solenoid operated valve 210, and actuator 54 with a double solenoid operated valve 212.

In addition to the above-described structure on the top of gripper mast 20, a number of limit switches attached to supporting members, not shown, are used for controlling an interlock system. The limit switches are actuated by the pneumatic actuators which contain pistons of a double acting type and connecting rods extend upwardly therefrom through plate 24 into a position adjacent the limit switches. The connecting rod 214 extending from the piston in pneumatic actuator 46 carries a striker plate 216 adjustably positioned on the rod to engage limit switch 218 on the down stroke and limit switch 220 on the up stroke. As more fully described hereafter, the limit switch 218 energizes a circuit which will visually show the fuel assembly gripper in the latched position while limit switch 220 when closed, will show the fuel assembly gripper in the unlatched position. Likewise, connecting rod 222 extending upwardly from pneumatic actuator 50 carries a striker plate 224 arranged to actuate limit switch 226 when in the lower position to visually show that the thimble plug gripper finger is in a latched position. When in its upper position, the striker plate 224 engages limit switch 228 to show that the thimble plug gripper finger is in an unlatched position. Also, connecting rod 230 extending upwardly from thimble plug raise-lower pneumatic actuator 54 carries the striker plate 232 which closes switch 234 when in the lower position to visually show that the thimble plug gripper is in the lowermost position and that plugs 162 are nested in their corresponding guide thimbles. As the connecting rod is raised, the striker plate closes switch 236 to show that the thimble plug gripper is in the raised position with plugs 162 removed from their guide thimbles or without plugs 162 if the thimble plug is to remain in the fuel assembly.

The function of the microswitches is to energize relays including switch contacts associated therewith to assure that a fuel assembly cannot be lifted unless certain pre-established conditions have been satisfied; that a fuel assembly cannot be dropped after the raising process has started; that a plug assembly cannot be dropped after the raising process is initiated; that a plug assembly cannot be lowered unless the fuel gripper fingers are latched to a fuel assembly; and the fuel assembly gripper actuator and the thimble plug gripper actuator are fail-safe in that loss of power or air supply will not result in unlatching of the grippers during the refueling process.

Figure 13A:
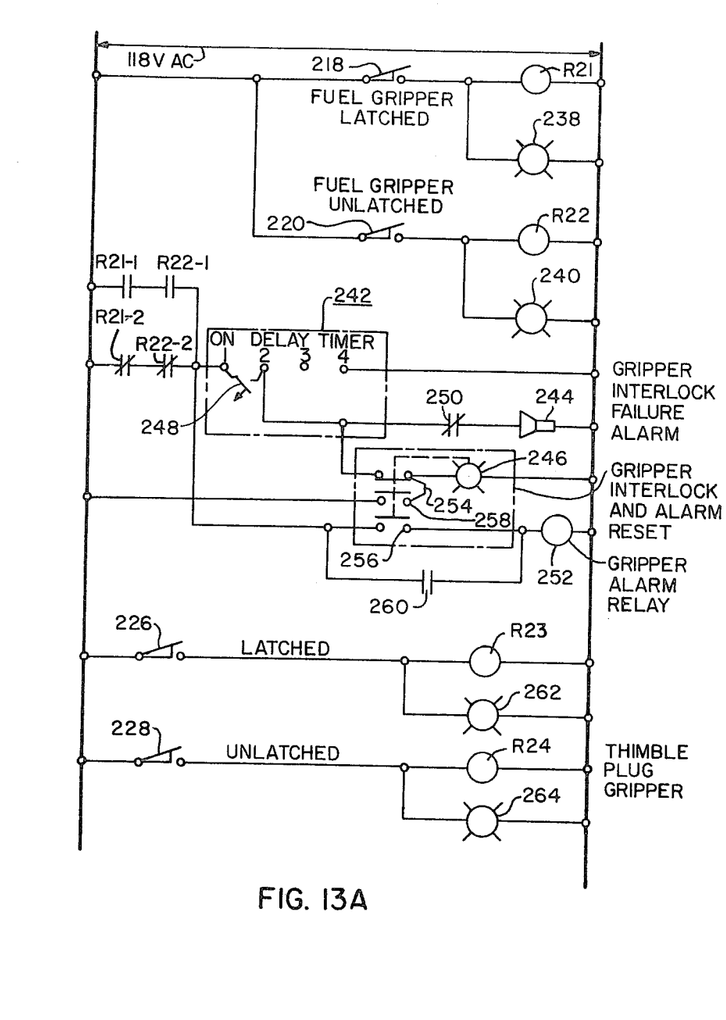
FIGS. 13A and 13B show the mast electrical system.
Figure 13B:
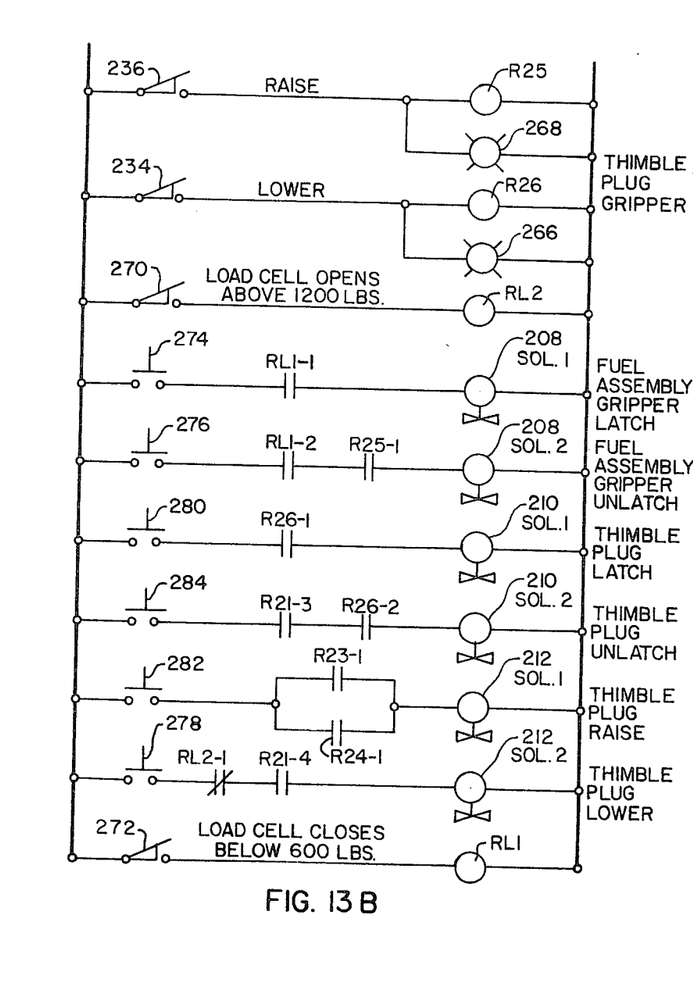

The electrical schematic diagram shown in FIG. 13 shows the relationship between the various components used to obtain the interlocking system described above. In view of the relevance of letter-numeral designation of parts in determining how the various components coact in the various interlocking systems, such letter-numeral designations will be used hereafter to help further in an understanding of the invention.

The fuel assembly thimble plug gripper interlock system is as follows: as indicated above all of the limit switches are mounted on top of the gripper mast and each limit switch is adapted to be contacted by a striker plate located on the appropriate piston cylinder rod. With the gripper mast located in position on top of a fuel assembly nozzle, when it is desired to cause the fuel assembly gripper fingers to engage the nozzle, the solenoid #1 of double acting valve 208, FIG. 12, is actuated to cause the cylinder rod 58 to move to a lower position thus causing striker plate 216 to close limit switch 218. As shown in FIG. 13, the limit switch energizes relay R21 and causes the lamp 238 to glow. When it is desired to move the fuel assembly gripper fingers 102 from a latch to an unlatched position, solenoid #2 of valve 208 is actuated which causes piston rod 214 and its attached striker plate 116 to move upwardly thus causing limit switch 220 to close. Upon closing the switch, relay R22 is energized and lamp 240 glows. The gripper mast cannot be raised unless the fuel assembly gripper fingers 102 are in either a fully latched or fully unlatched position and both a visible and audio alarm is provided to indicate when these conditions exist simultaneously or neither condition exists in the event of malfunction. This is provided by contacts R21-1,2 and R22-1,2 respectively controlled by relays R21 and R22, such contacts being in a circuit including a delay timer 242 and an alarm horn 244 and flashing light 246. Since the fuel assembly gripper fingers will always be in a latched or unlatched position, with either relay R21 or R22 energized, the contacts are arranged such that contacts R21-2 are open and contacts R21-1 are closed when R21 is energized and the fuel gripper fingers are in a latched position. Likewise, contacts R22-2 are open and contacts R22-1 are closed when R22 is energized and the fuel gripper fingers are in an unlatched condition. Under these conditions, the circuit is deenergized to the delay timer and alarm system. The function of the timer is to provide a delay time of sufficient length, about 1 second, during which the fuel gripper fingers 102 are moved between a latched and unlatched position or vice versa. Since the latching operation is very rapid, any delay greater than 1 second indicates that the fuel gripper fingers are in neither in a latched nor unlatched position. When the fuel gripper fingers are moved from a latched to unlatched position, relay R21 is deenergized and the contact R21-2 closes while contact R21-1 opens. As the striker plate 216 moves upwardly to close limit switch 220, relay 240 is energized and the normally closed contacts R22-2 are opened while contacts R22-1 closes. As a result, the circuit is open between the supply lines and the delay timer. Assuming a condition where the fuel gripper fingers stop between a latched and unlatched position, after 1 second, switch 248 closes to energize horn 244 through the normally closed gripper alarm relay 250. Simultaneously, light 246 will commence flashing. To eliminate discomfort from the loud noise of the alarm horn, a relay 252 is included in the circuit and when it is not energized, contacts 250 are in a normally closed position. To isolate the horn, an alarm reset button 254 is actuated to close contacts 256 which then energize relay 252 which in turn opens contacts 250 thus isolating the alarm horn 244. Simultaneously, contacts 258 are closed thus keeping the flashing light in the energized circuit. Also, contacts 260 close to keep relay 252 in the energized condition.

The circuit is also arranged to show when the thimble plug gripper fingers are in a latched or unlatched position. As shown in FIGS. 3, 12 and 13, when solenoid #1 valve 210 is actuated to move the piston in pneumatic actuator 50 downwardly to a thimble plug gripper latch position, the striker plate 224 closes limit switch 226 thus energizing relay R23 and causing lamp 262 to glow. Likewise, as solenoid #2 of valve 210 is actuated to move connecting rod 222 upwardly, striker plate 224 closes limit switch 228 which energizes relay 24 and causes lamp 264 to glow.

The same arrangement is used for indicating when the thimble plug gripper is in either a raised or lowered position. Actuation of the solenoid #2 of valve 212 lowers the piston in pneumatic actuator 54 thus causing striker plate 232 to close limit switch 234 which energizes relay R26 and causes lamp 266 to glow. In like manner, the raising of connecting rod 230 causes striker plate 232 to close limit switch 236 which energizes relay R25 and causes lamp 268 to glow.

The system described above includes a number of interlocking features used to provide safe and reliable operation during the time a fuel assembly is either being placed in or withdrawn from the reactor and during the time the thimble plugs are being either inserted or removed from one of the fuel assemblies. As shown in FIG. 13, the interlocking system includes a load cell mounted on the fuel assembly hoist motor 15 supported by crane 12 on containment wall 10. A limit switch 270 in the load cell opens when a load of 1200 pounds is imposed on the fuel assembly gripper hoist. When the load exceeds 1200 pounds relay RL2 is deenergized closing contacts RL2-1 permitting the thimble plug gripper to be lowered only when the fuel assembly gripper is carrying a fuel assembly.

The load cell mounted on the hoist equipment 15 further includes a second limit switch 272 which is designed to close when a load less than 600 pounds is imposed on the fuel assembly gripper hoist. As the load drops below this 600 pound value, relay RL1 is energized closing contacts RL1-1 and 2 permitting the fuel gripper to be latched or unlatched. These circuits are inactive at all times except when the gripper is resting on a fuel assembly, thus indicating that the gripper mast 20 is resting on a fuel assembly positioned either within or outside the reactor.

This interlock arrangement helps assure safe and reliable performance of the fuel assembly and thimble plug gripping mechanisms. To achieve operation of these different mechanisms, as shown in FIG. 13, a series of pushbuttons are utilized to initiate the particular operation desired during reactor refueling. Since the major actions performed on the fuel assembly, finger plug and raise/lower mechanisms are caused by pistons axially movable in the air motors or pneumatic actuators, it is evident that control of these actuators will determine operation of the component parts. Such pneumatic actuator control is accomplished by controlling the solenoid operated valves located in the two air supply lines leading to each of the pneumatic actuators. Also, to assure safe and reliable operation of the fuel assembly and thimble plug latching mechanisms and the thimble plug raise-lower mechanism, the solenoid operated valves are located in an interlocking circuit which performs specific functions. As shown in FIG. 13 a pushbutton is used for each of the major operations to be performed.

OPERATION

When it is desired to remove a fuel assembly from the reactor or thimble plugs from the control rod guide thimbles in a fuel assembly, the crane hoist mechanism 15 is energized to lower the gripper mast 20 down onto the top of a fuel assembly. As the mast approaches within about ten inches of the fuel assembly, the guide pins 158 extending upwardly from the fuel assembly top nozzle, enter complementary openings formed in the bottom of the gripper mast and as the mast is continued to be lowered, the guide pins 158 engage the bottom surface of blocks 145 which then act to move guidance tube 148 upwardly against the action of springs 154 thus compressing the springs and placing them under compression. Since lock key 142 moves with sleeve 148, the upward movement of guidance tube 148 causes or allows lock key 142 to be removed from slot 140. It will be noted that the only time key 142 is out of engagement with slots 138 or 140 is during the time the gripper mast is firmly bottomed out on the top of a fuel assembly. At this time, the key 142 has been disengaged from its slot 140, the thimble plug gripper mechanism is in a raised position, and the fuel gripper fingers are moved from the unlatched to the latched position. To move the fuel assembly gripper fingers 102 from the unlatched position shown in the dotted lines of FIG. 3 to the latched position shown in the full lines of FIG. 3, pushbutton 274, FIG. 13, is closed to actuate solenoid #1 of valve 208 on the trolley deck to an open position. Air therefore supplied to the fuel assembly gripper pneumatic actuator 46 causes the piston therein and cylinder rod 214 to move downwardly thus closing limit switch 218 and energizing relay R21 and the time delay circuit shown in FIG. 13. Since the gripper mast is resting on the fuel assembly, the limit switch 272 in the load cell on the hoist mechanism is closed because the hoist mechanism is carrying less than 600 pounds. This action energizes relay RL1 which closes its contacts RL1-1 in the pushbutton 274-solenoid #1 of valve 208 circuit. When contacts RL1-1 close, solenoid #1 of valve 208 operates its valve to the fuel assembly gripper pneumatic actuator 46 and causes connecting rod 62 and connector bars 122 to move downwardly thus causing fuel assembly finger actuator cam 126 to move downwardly in slot 132, thereby rotating fuel assembly gripper fingers 102 from the unlatched to the latched positions. A fuel assembly then can be removed from the reactor core by energizing hoist motor 15 on crane 12. As soon as the gripper mast 20 commences rising off the fuel assembly, springs 154 will urge guidance tube 148 and its attached lock key 142 in a downward direction. Since lock key 142 will be in alignment with slot 138 because fingers 102 are in a latched position, further movement of the mast upwardly will allow continued movement of guidance tube 148 and attached key 142 downwardly thus permitting key 142 to engage slot 138 and thereby mechanically lock fingers 102 in a latched position. The hoist mechanism 15 continues to lift the fuel assembly 16 upwardly a distance of about thirty feet into the stationary mast 21 which then completely houses or encloses the fuel assembly. This action allows the bottom end thereof to clear the top of the reactor pressure vessel 71 and thereby permit crane movement of the mast and fuel assembly in a horizontal direction through the fuel transfer canal.

Reversal of the above described unloading process is repeated when it is desired to load a fuel assembly in the reactor core. Crane 12 moves the stationary mast 21 and contained fuel assembly into a position over the core and immediately above an open core position in which it is to be placed. As it is lowered into position and the weight of the fuel assembly is taken up by the lower core plate, guide pins 158 raise guidance tube 148 and its attached key 142 is moved out of slot 138. In order to move the fuel assembly gripper fingers to an unlatched position, pushbutton 276 is depressed to energize solenoid #2 for air valve 208 which directs air to the fuel assembly gripper pneumatic actuator 46. This action moves striker plate 216 upwardly into contact with limit switch 220. However, before the solenoid can be energized contacts RL1-2 must be closed and will close because the crane hoist is carrying a fuel assembly load less than 600 pounds. The second condition which must be satisfied is that the thimble plug gripper must be in a raised position before the circuit to the solenoid #2 of valve 208 can be energized. Contacts R25-1 are closed by relay R25 which is controlled by limit switch 236 and striker plate 232. As these sets of contacts close, solenoid #2 of valve 208 is then energized thus admitting air to fuel assembly gripper pneumatic actuator 46 which moves connecting rod 62 and connector bars 122 upwardly. Pivot pin 126 rides up slot 132 and rotates the fuel assembly gripper fingers 102 to an unlatched position.

When it is desired to remove the thimble plug assembly and attached thimble plugs from the control rod guide thimbles located in a fuel assembly, the fuel assembly gripper must must be holding the weight of a fuel assembly and the fuel assembly gripper fingers 102 must be in a latched position. As shown in FIG. 13, depressing pushbutton 278 will energize solenoid #2 of valve 212 when contacts RL2-1 are closed which means that the relay RL2 in the load cell is energized thus indicating that the weight of a fuel assembly is imposed on the crane hoist. Also, if the fuel assembly gripper fingers are latched in position, relay R21 will close contacts R21-4 thus completing the circuit between the pushbutton and solenoid #2 of valve 212. As the solenoid #2 of valve 212 is energized, air supplied to the thimble plug raise-lower pneumatic actuator 54 moves the raise-lower tube 32 downwardly into contact with the thimble plug assembly. Such downward movement of tube 32 causes striker plate 232 to close limit switch 234 which energizes relay 26. Contacts R26-1 thereupon close and as pushbutton 280 is moved to a closed position, solenoid #1 of valve 210 will be energized thus providing air to the thimble plug gripper pneumatic actuator 50. Thimble plug gripper connecting rod 64 thereupon moves downwardly together with tube 30 which causes sleeve 198 to move relative to the thimble plug gripper body 176. This action causes cams 202 to engage the side surface of fingers 184 and accordingly moves the latching jaws 186 into contact with the underside of bar 172 on the thimble plug assembly. This action locks plate 188 and all of the thimble plugs in the fuel assembly guide thimbles to the thimble plug gripper.

To raise the thimble plug assembly and plugs from their guide thimbles, the thimble plug fingers must be in in a latched position. The contacts R23-1 are controlled by relay R23 and these in turn are controlled by limit switch 226. When pushbutton 282 is closed and contacts R23-1 are closed, a circuit is completed through solenoid #1 of valve 212 thus permitting the application of air to the other side of thimble plug raise-lower pneumatic actuator which then acts to raise the thimble plugs out of their corresponding control rod guide thimbles located in the fuel assembly.

To replace the thimble plug assembly in a fuel assembly, before solenoid #2 of valve 210 can be energized, the fuel assembly gripper fingers must be in a latched position and when this condition exists, relay R21 is energized which closes contacts R21-3 in the pushbutton 284 circuit. Also, the thimble plug assembly carrying the thimble plugs must be in a lowered position and when this condition exists, relay R26 is energized which closes contacts R26-2. As these conditions are met and pushbutton 284 depressed, the closed circuit will energize solenoid #2 of valve 210 thus causing tube 30 and sleeve 198 to move upwardly. Cams 202 engage the side surfaces of thimble plug fingers 184 and thereby rotate it about pivot pin 182 to an unlatched position.

To raise the thimble plug gripper after releasing the thimble plug assembly, relay 24 is energized through limit switch 228 which is closed when the gripper is unlatched. Relay 24 closes contacts R24-1 in solenoid #1 of valve 212 to complete the circuit when pushbutton 282 is depressed. This action energizes solenoid #1 of valve 212 which supplies air to pneumatic actuator 54 thus moving the raise-lower tube upwardly. Such upward movement of the tube 32 causes striker plate 232 to close limit switch 236 which energizes relay R25 and closes contacts R25-1. This permits the fuel gripper fingers to unlatch when the gripper is resting on a fuel assembly and contacts RL1-2 are closed in the load cell with less than 600 pounds load.

As the thimble plug gripper is raised with a thimble plug, a failsafe function is performed to prevent release of the thimble plug except when it is inserted into the fuel thimble guides as follows: Depression of pushbutton 282 and energizing solenoid #1 of valve 212 supplies air to the thimble plug raise-lower pneumatic actuator 54. This action raises the thimble plug gripper, tube 32 and the thimble plug gripper finger actuator tube 30. Such upward movement also carries plate 70 upward while plate 78, attached to connecting rod 64, remains at a constant elevation. Separation of plates 74 and 64 prevents raising tube 30 in respect to tube 32 to perform the unlatching function while the thimble plug gripper is in the raised position.

It will be apparent that many modifications and variations are possible in light of the above teachings. For example, the pneumatic actuators for moving fuel assembly gripper fingers 102, and the thimble plug gripper fingers 184, between latched and unlatched positions, have been disclosed as being dual actuators but obviously such actuators for gripper fingers 102 and 184 may be combined into single units and still perform the same function. Also, in lieu of using pneumatic actuators and their associated air control valves, solenoids or other electrical motion producing devices may be employed to achieve actuation of fingers 102 and 184 between latched and unlatched positions, and for raising or lowering the thimble plug assembly relative to a fuel assembly. It therefore is to be understood that within the scope of the appended claims, the invention may be practiced better than it is specifically described.

What is claimed is:

1. Apparatus for loading and unloading a fuel assembly in the core of a nuclear reactor and for removing and inserting control rod guide thimble plugs in the fuel assembly during a reactor refueling operation comprising:

a gripper mast adapted for support by an overhead crane and arranged to be connected to a mast raising and lowering device thereon which effects vertical movement of said mast in a housing permanently mounted on said crane, said crane being horizontally movable on the top wall of a containment for said reactor and into a position wherein the mast is placed in alignment with a fuel assembly to be removed from said core;

said gripper mast comprising a cylinder approximately as long as a fuel assembly;

a first actuator on said mast;

means connecting said actuator to fuel assembly gripper fingers pivotally mounted in said mast at spaced intervals around the bottom thereof for selectively moving said fingers into and out of latching engagement with said fuel assembly;

said means connecting said actuator to the fuel assembly gripper fingers including axially movable bars having a pin on the end thereof which fits into a slot provided in each of said fingers so that when the actuator moves said bars downwardly, the pins ride in said slots and move the fingers into a fuel assembly nozzle latching position, while movement of the bars upwardly causes the fingers to move to an unlatching position;

a pair of spaced grooves on the upper surface of each of said fingers;

a movable sleeve in said mast;

locking keys mounted on said sleeve and respectively in a position above and in alignment with at least one of the grooves provided in each of said gripper fingers;

so that when said gripper fingers are in a latched position, the keys respectively engage the grooves on top said fingers which correspond to a latched position, and when the fingers are in an unlatched position, said keys engage the grooves corresponding to an unlatched position thereby respectively locking said fingers in either latched or unlatched positions.

2. Apparatus according to claim 1 wherein an inwardly extending flange is affixed to the bottom of said mast, said flange having multiple spaced openings therein which are complementary to the size of guide pins extending upwardly from a nozzle on said fuel assembly;

blocks mounted on the bottom of said sleeve, said sleeve and blocks being located immediately above said flange openings;

the arrangement being such that as the gripper mast is placed on top a fuel assembly, the guide pins move upwardly through said flange openings and into contact with the bottom surface of said blocks thereby moving said sleeve and its attached locking keys upwardly out of engagement with the grooves in said gripper fingers thus permitting the actuator and means connected thereto to move said gripper fingers in a latching or unlatching direction relative to the nozzle of said fuel assembly.

3. Apparatus according to claim 2 wherein biasing means on said mast cooperate with said sleeve to urge the locking keys into one of said slots during the time said mast is carrying the weight of a fuel assembly.

4. Apparatus according to claim 1 wherein said actuator comprises a cylinder having a piston axially movable therein;

solenoid actuated valves in air lines connected to opposite ends of said cylinder; and electrical means respectively connected to each of said solenoid valves for selectively admitting air to opposite sides of said piston and thereby respectively causing the actuator bars to move said latching fingers between latching and unlatching positions.

5. Apparatus according to claim 4 wherein said electrical means comprises a pair of spaced limit switches;

a connecting rod extending upwardly from said actuator and having a striker plate thereon arranged to engage said limit switches when the piston respectively moves said fingers between latching and unlatching positions.

6. Apparatus according to claim 4 wherein a hoist motor on said crane is adapted to raise and lower said mast;

said electrical means including a load responsive device on said hoist having electrical contacts therein, said responsive device being arranged to close said contacts when said mast is resting on a fuel assembly thus indicating that it is not lifting a fuel assembly; and means electrically connecting said contacts with the solenoids for said valves, so that when said contacts are closed, a circuit is completed through said solenoids which operate said valves and accordingly supply air to the piston in said cylinders and effect movement of fuel assembly gripper fingers to a latched position.

7. Apparatus according to claim 6 wherein said electrical means further include at least one switch adapted to be actuated to a closed position by the means on said mast when said means which raises and lowers the device supporting said guide thimble plugs from said fuel assembly is in a raised position; and means connecting said switch with the solenoids for said valves and said load responsive device contacts;

whereby as said switch and contacts close, the solenoids open said valves to provide air to said cylinders which cause the fuel assembly gripper fingers to move to an unlatched position.

8. Apparatus according to claim 1 including a device in said mast which supports multiple guide thimble plugs designed to be positioned in complementary openings in control rod guide thimbles in said fuel assembly;

means on said mast for selectively raising said device and its supported guide thimble plugs from said fuel assembly or lowering the same in said complementary openings in the fuel assembly, said means on the mast comprising:

a second actuator on said mast;

second means connecting said actuator to a latching mechanism adapted for positioning adjacent said device and its supported guide thimble plugs when said mast is supporting the weight of a fuel assembly;

third means cooperatively coupled with said latching mechanism and independently operable to selectively cause said latching mechanism to respectively latch on or unlatch from said device and its supported plugs; and second control means associated with said second actuator for causing said second actuator to vertically raise or lower said device with its supported plugs respectively into or out of control rod guide thimbles in said fuel assembly.

9. Apparatus according to claim 8 wherein said second means comprises a connector connected to and vertically movable by said second actuator; and said latching mechanism includes a member attached to said connector and being arranged to support plug latching fingers which are selectively moved by said third means into latching or unlatching engagement with said device and its supported plugs.

10. Apparatus according to claim 9 wherein said third means comprises a sleeve concentrically disposed on said member; and cam means on said sleeve positioned to engage said plug latching fingers and thereby move it between latched and unlatched positions as the sleeve moves vertically on said member.

11. Apparatus according to claim 9 wherein said third means comprises a third actuator mounted on said mast, a connector connecting said third actuator with a sleeve concentrically disposed on said member; cam means on said sleeve positioned to engage the plug latching finger and move it into latcing or unlatching engagement with said device as said third actuator moves the sleeve vertically on said member; and third control means associated with said third actuator for causing said third actuator to move said plug gripper finger into latching and unlatching engagement with said device supporting said plugs.

12. Apparatus according to claim 11 wherein each of said second and third actuators comprises at least one cylinder having a piston therein, said connector being attached to one end of said piston and a member on its other end positioned to selectively contact a pair of vertically spaced switches mounted on the mast above each of said second and third actuators;

air lines having solenoid operated valves therein connected to opposite sides of each of said cylinders to produce slidable operation of the piston between upper and lower positions which accordingly act to open or close each of said switches; and first interlocking means between each of said switches adapted to be actuated by said second actuator and their corresponding solenoids for precluding operation of said second control means to raise the thimble plug device unless the plug latching finger is in a latched position or in an unlatched position, and to lower the thimble plug device unless the fuel assembly gripper fingers are latched onto a fuel assembly and are holding the weight of a fuel assembly.

13. Apparatus according to claim 12 wherein said interlocking means includes a relay in circuit with each of said switches, and contacts for said relays respectively in circuit with the solenoids for said valves in the air lines leading to the top and bottom of each cylinder.

14. Apparatus according to claim 12 wherein second interlocking means are located between each of said switches adapted to be actuated by said third actuator and their corresponding solenoids for precluding operation of said third control means to move said plug gripper finger into latching engagement with the plug device unless said latching mechanism is in its lowermost position; and to move said plug gripper finger out of latching engagement with said plug device unless the latching mechanism is in its lowermost position and said fuel assembly gripper fingers are latched onto a fuel assembly.

15. A method for loading and unloading a fuel assembly in the case of a nuclear reactor and for inserting and removing control rod guide thimble plugs in the assembly during a reactor refueling operation comprising the steps of:

placing a hollow cylindrical enclosure over the open upper end of a reactor pressure vessel;

lowering a gripper mast vertically movable therein onto the top of a fuel assembly positioned in said pressure vessel;

actuating a first mechanism on said mast which moves a first device mounted therein into a latching relationship with said fuel assembly;

actuating a second mechanism on said mast which moves a second device into latching relationship with a control rod guide thimble plug assembly containing plugs which close the openings in guide thimbles in said fuel assembly;

raising said thimble plug assembly from its position in said fuel assembly; and raising said fuel assembly from the pressure vessel and subsequently transferring the same to a fuel assembly transfer canal.

16. The method according to claim 15 including the step of locking said first device to said fuel assembly upon commencement of the step of raising said fuel assembly from the pressure vessel.

17. The method according to claim 15 including the step of locking said device in an unlatched position upon commencement of the step of lifting said mast from its position on said fuel assembly.

18. The method according to claim 15 including the steps of sensing the weight of a fuel assembly after said first device is latched to the fuel assembly and after commencement of a step of lifting the mast upwardly prior to raising the thimble plug assembly from its position in said fuel assembly.

* * * * *